US011878191B2

(12) United States Patent
Chu

(10) Patent No.: US 11,878,191 B2
(45) Date of Patent: Jan. 23, 2024

(54) AUTOMATICALLY BRAKING BELAY DEVICE WITH RELEASER

(71) Applicant: Jaenam J Coe, Los Angeles, CA (US)

(72) Inventor: Young Chu, Fullerton, CA (US)

( * ) Notice: Subject to any disclaimer, the term of this patent is extended or adjusted under 35 U.S.C. 154(b) by 443 days.

(21) Appl. No.: 16/858,507

(22) Filed: Apr. 24, 2020

(65) Prior Publication Data

US 2021/0330995 A1 Oct. 28, 2021

(51) Int. Cl.
*A62B 1/14* (2006.01)
*A63B 29/02* (2006.01)

(52) U.S. Cl.
CPC ................ *A62B 1/14* (2013.01); *A63B 29/02* (2013.01)

(58) Field of Classification Search
CPC ........ A62B 1/14; A63B 29/02; A63B 2209/08
See application file for complete search history.

(56) References Cited

U.S. PATENT DOCUMENTS 5,054,577 A * 10/1991 Petzl ........................ A62B 1/14 182/5
5,850,893 A * 12/1998 Hede ........................ A62B 1/14 182/5
6,899,203 B1 * 5/2005 Golden .................... A62B 1/14 182/5
8,348,016 B2 * 1/2013 Lewis ...................... A62B 1/14 182/5
8,733,739 B2 * 5/2014 Mauthner ............. A63B 29/02 254/408
10,173,081 B2 * 1/2019 Rogelja .................... A62B 1/14
2010/0224443 A1 * 9/2010 Broten ................... A62B 99/00 74/577 M
2011/0011672 A1 * 1/2011 Price, Jr. ................ A63B 29/02 182/5
2011/0203871 A1 * 8/2011 Faye ..................... F16D 25/087 182/3
2013/0180800 A1 * 7/2013 Mauthner ............. A62B 35/04 182/5
2014/0174850 A1 * 6/2014 Paglioli .................... A62B 1/14 182/5
2016/0296771 A1 * 10/2016 Malcolm .................. A62B 1/14
2017/0189725 A1 * 7/2017 Malcolm ................ A63B 29/02
2019/0224503 A1 * 7/2019 Malcolm .................. A62B 1/14

* cited by examiner

*Primary Examiner* — David M Upchurch

(57) ABSTRACT

An automatically braking belay device for use in belaying climber or descending with a rope, using the pull of the rope to activate braking by the roll of the cam within the frame of the device. An adaptive release lever unjam the rope to release with closing mechanism utilizing magnets for practically permanent and fail safe closure.

8 Claims, 7 Drawing Sheets

AUTOMATICALLY BRAKING BELAY DEVICE WITH RELEASER

SUMMARY

An automatically-braking belay device for controlling descent of a load along a rope includes a frame of base plate, with a cam assembly pivotably attached to the base plate which remains in an adhered position with the base plate with pulling forces of magnets to facilitate travel of the rope through the designated path within the device until automatically braked with an abrupt pull, and a cover plate also pivotably attached to the base plate by a pin at an end to keep the rope within the designated path formed within the base plate and the cam assembly.

The cam assembly with a proprietarily shaped cam around its circumference is attached to the base plate by a pin at the central axis of the cam, while the other end of the cam assembly is pivotably attached by a torque-hinge to a lowering handle.

A stationary spacer attached to the base plate works as the friction jamming device when the cam assembly is pulled by the rope narrowing the distance between a protrusion of the cam and the spacer.

A "lowering" handle is attached to the cam assembly to enable the control of the amount of friction between the cam and the spacer with pulling of the handle. By pulling the handle farther away from the base plate the pulling force from tension of the rope enables the rope to overcome the friction between the cam and the spacer, allowing the rope to move along the path of the belay device resulting in controlled lowering of the load.

An attachment hole intended for a carabiner or similar attachment means exists on the base plate and on the cover plate such that when the opening plate is in the closed position, an operator can lock the belay device in the closed position by inserting any suitable attachment means through the attachment holes of the base plate and the cover plate, including but not limited to a carabiner.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Figure 1:
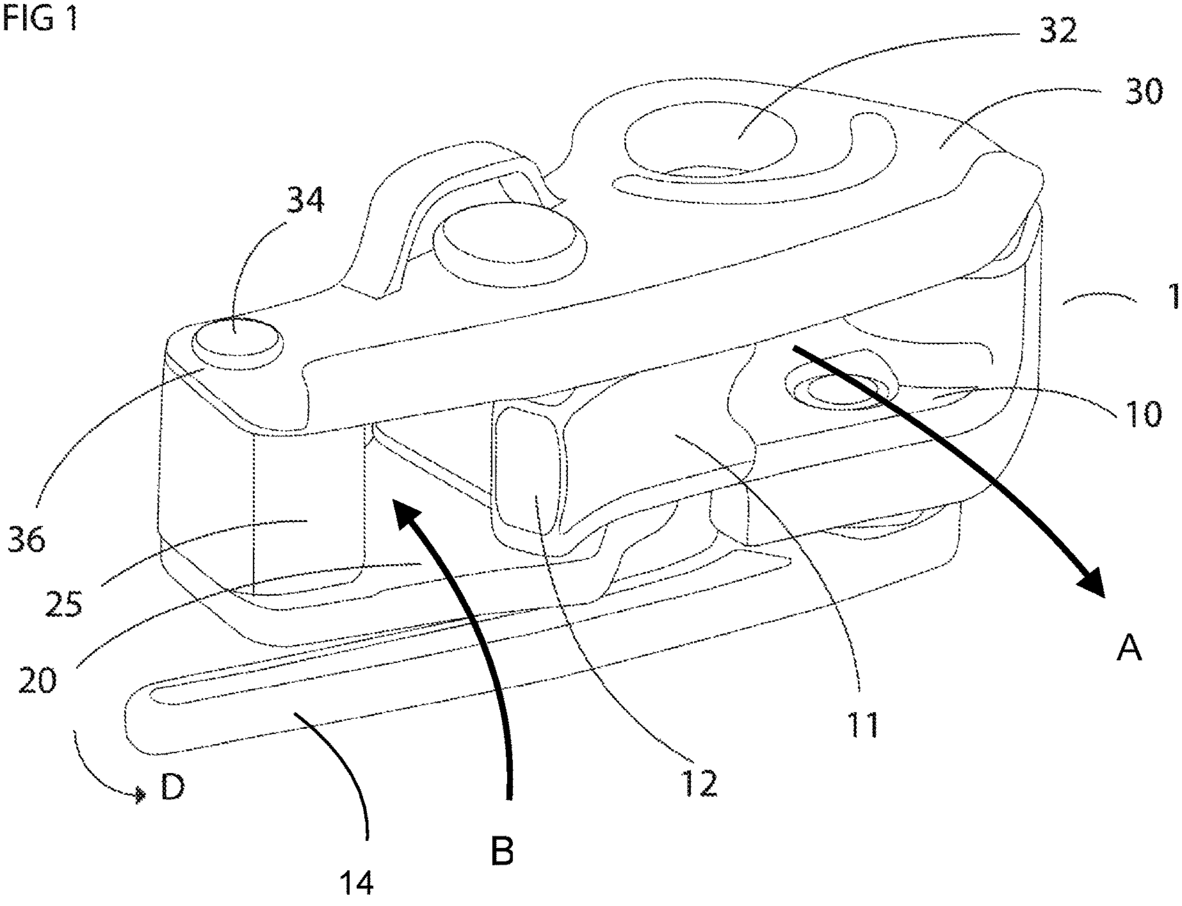
FIG. 1 is a perspective view of one embodiment of a belay device in accordance with the invention.

As shown in FIG. 1, the present invention is a belay device 1 having a cam assembly 10, base plate 20, which together with cover plate 30 will hold and retain rope. Rope is reeved within the intended path such that the rope with a load to be managed is fed through the device in direction B between the spacer 25 and the cam 11, comes out and pulls in direction A. Cover plate 30, shown in closed position, is pivotably attached to base plate 20 with the pin 34, which allows a user to retain the rope within the path in the belay device 1. Hole 32 of the cover plate along with similar hole of the base plate, to be aligned when in closed position, accommodate means of attachment of the belay device to the belayer, typically accomplished with such attachment means as a carabiner, but any other suitable attachment may alternatively be used. The attachment hole 32 if the cover plate and the matching hole of the base plate allow the attachment means such as a carabiner to pass through the cover plate 30 and the base plate 20 so that when belay device 1 is in use in closed position, the employment of the attachment means keep the cover plate 30 to remain closed. Lowering Handle 14 is pivotally mounted to the cam assembly 10. An operator can control the release of rope by rotating and pulling the Lowering handle 14 in direction D.

Figure 2:
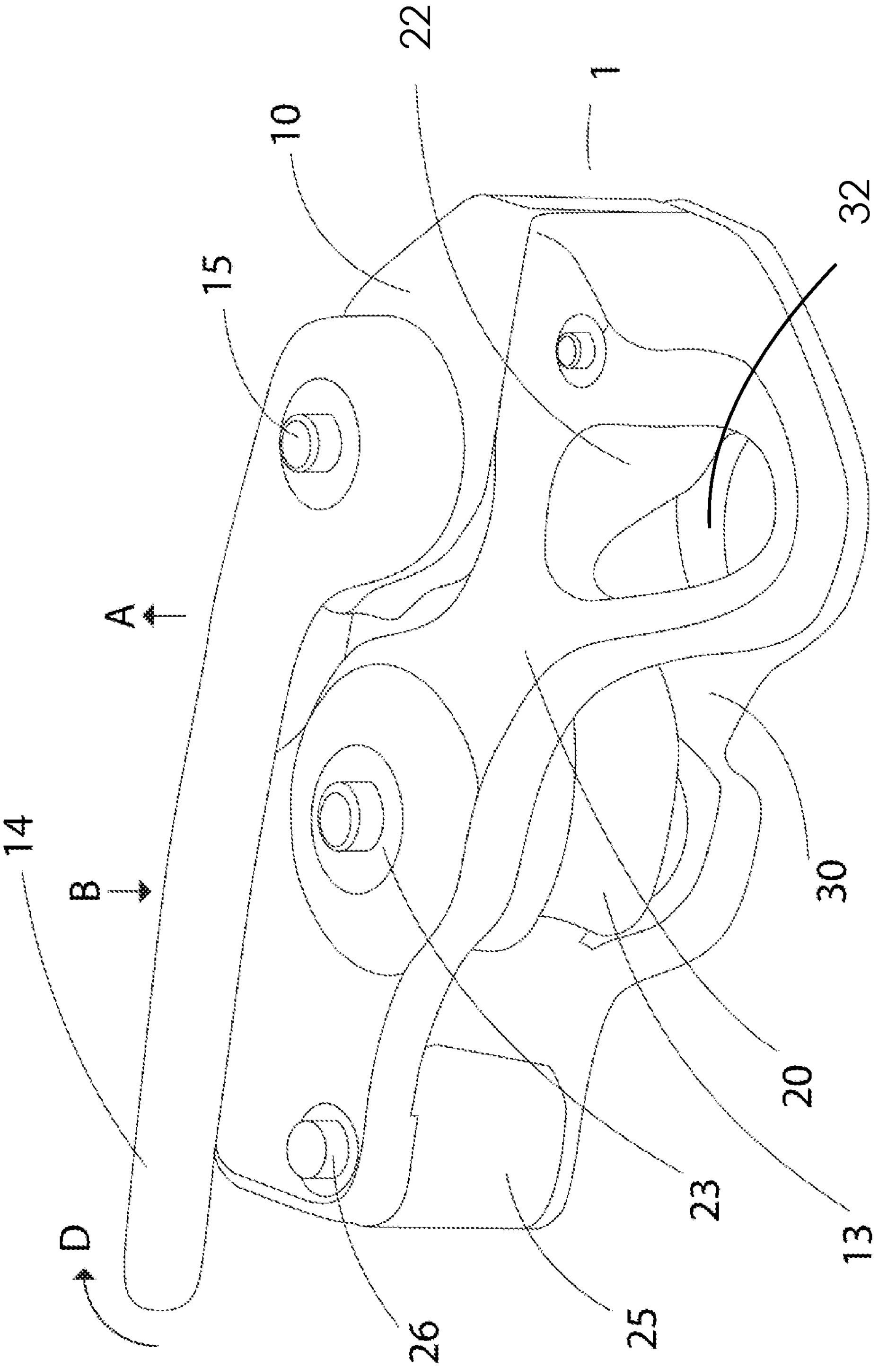
FIG. 2 is another perspective view of the belay device of FIG. 1 as seen from the opposite side from the view point of FIG. 1.

FIG. 2 shows belay device 1 as seen in the opposite view point from the FIG. 1 to show the opposite side of the belay device 1 with cam assembly 10, base plate 20 and cover plate 30, as well as their relationship. Cam assembly 10 has U-shaped groove 13 around the circumference of the cam to enhance the frictional interface between rope and the cam as tension is applied to rope. Cam assembly is pivotable within limited angle and mounted to base plate 20 at the axis of cam 23. Lowering handle 14 is pivotable attached to cam assembly 10 and on a tension-springed pin 15 with torque in the opposite direction of D to keep the lowering handle in the closed position when not in use. With the internal range limited by blockage, the lowering handle is allowed to be pulled limited travel up to a point where the cam assembly itself could be pulled down in direction D.

Figure 3:
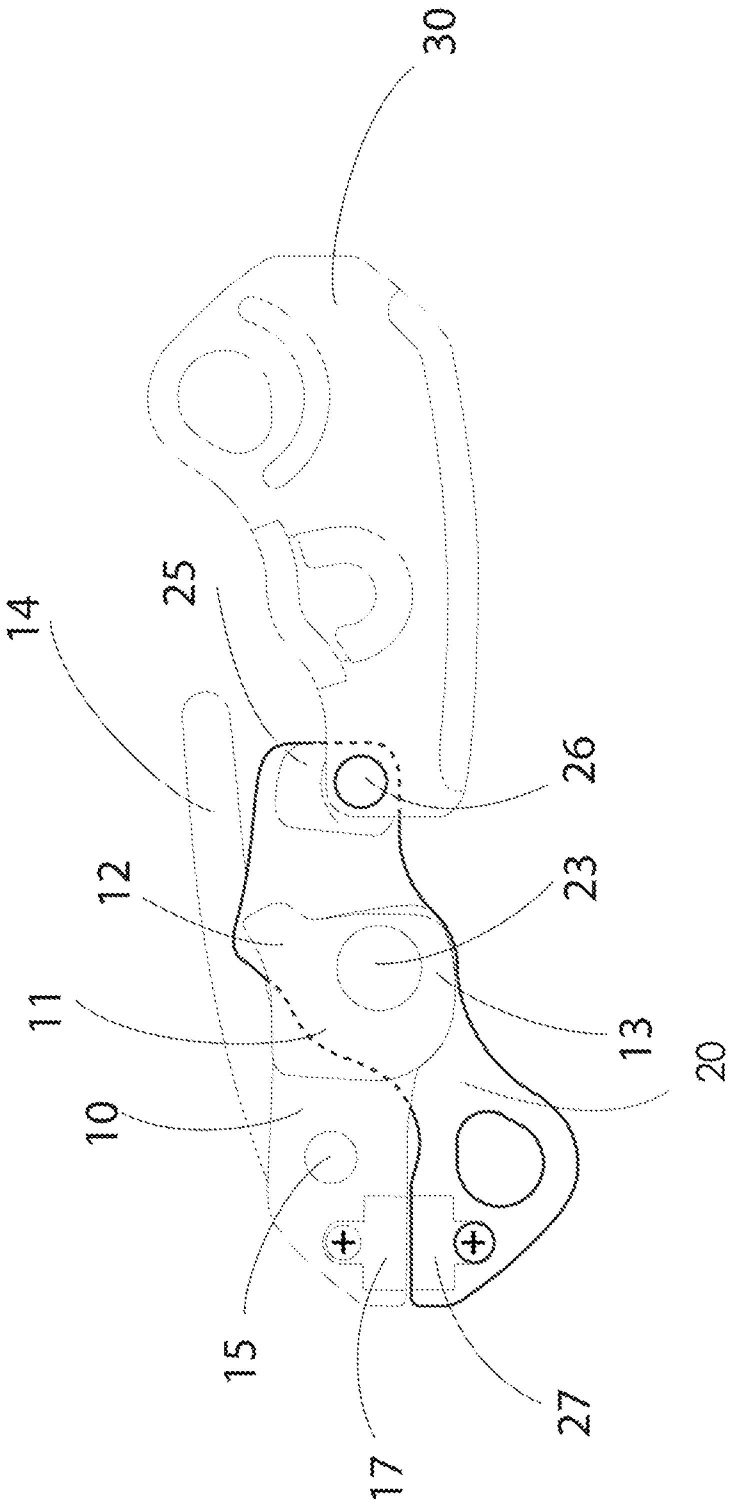
FIG. 3 is a side view of the belay device of FIG. 1 with a cover plate open.

In FIG. 3 shown with cover plate open to illustrate the position when the rope is to be fed freely within the allowed velocity. The cover plate 30 is pivotably attached to the base plate 20 with a pin over and onto spacer 25. Cam assembly 10 is pivotably attached to base plate on the axis at the pivoting center with pin 23 which is either with or without spring in the two embodiments of the invention. In one embodiment, the employment of the two magnet units 17 and 27 at the "jaw" formed by base unit 20 and the cam assembly 10, keep the cam assembly in stationary position without employment of spring at 23. In another embodiment at the axis 23 a spring with torque in the opposite direction but also with less than the pulling force of the two magnet units is utilized to stabilize the braking action of the cam as further illustrated.

Figure 4:
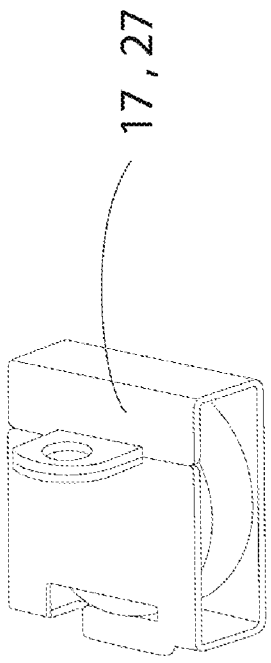
FIG. 4 is a detailed, perspective view of a magnet assembly.

FIG. 4 show detailed perspective of Magnet assemblies 17 and 27 of cam assembly and base plate, respectively, which together form a "jaw" and hold the cam assembly stationary when not pulled apart by frictional force of the rope in tension.

Figure 5:
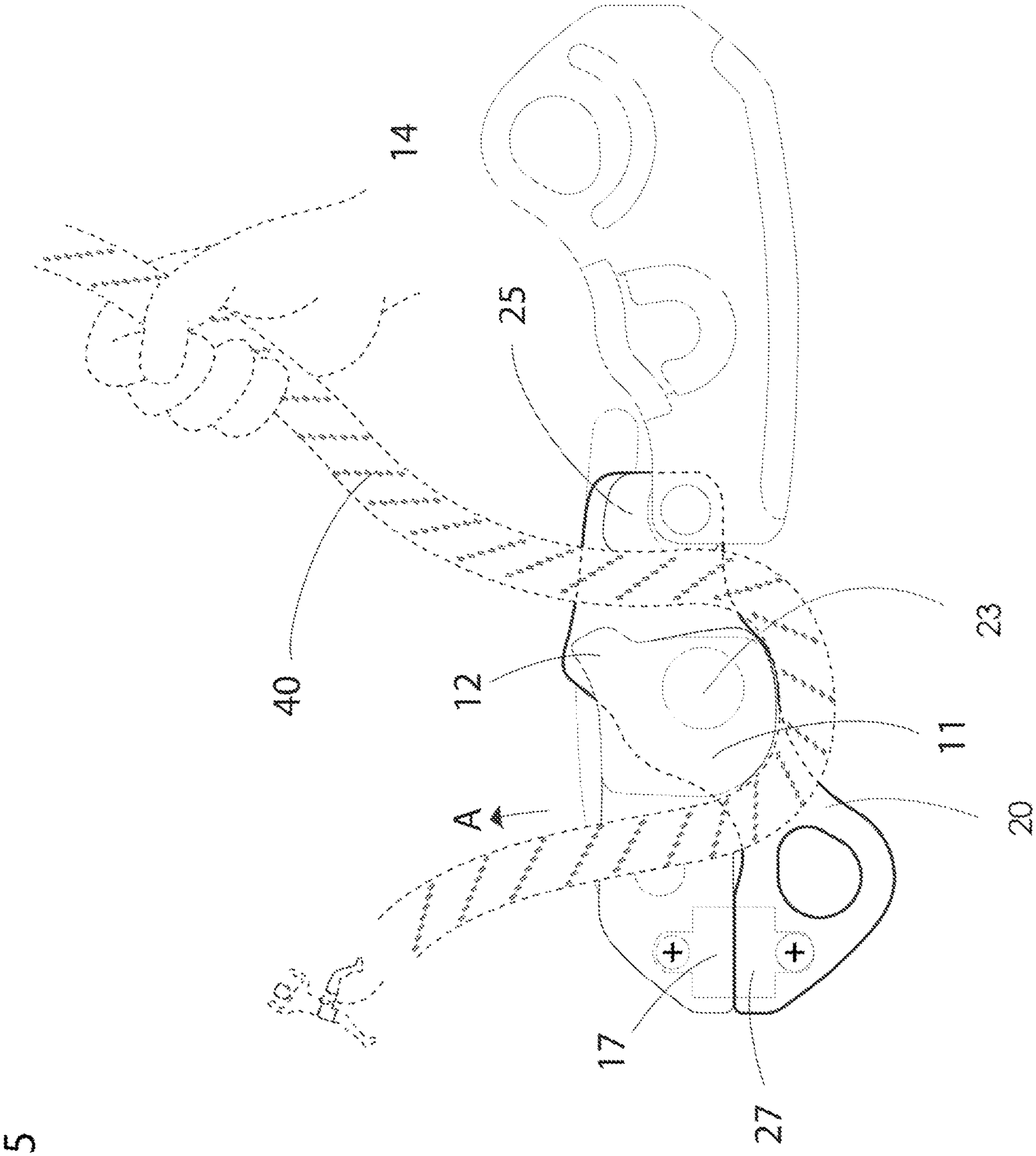
FIG. 5 is a side view of the belay device of FIG. 1, showing a rope installed as would be seen by an operator in use, with a cover plate open to illustrate interior path of the slackened rope, when the braking by the cam is not engaged.

In FIG. 5, shown with cover plate open to illustrate the path of the rope within the device, a belayer may install rope 40 by inserting the rope into the gap opening between the spacer 25 of the base plate 20 and partially around the circumference of the cam 11 integrated as a part of the cam assembly, which part is pivotably attached on axis 23 to base plate 20, and a lowering handle 14 and magnet assembly 17 attached on the other end of the cam assembly forming a part of the magnetized jaw with the matching magnet assembly 27 on the base plate 20. While cam assembly comprises of cam and an extension part where the Lowering handle and magnet assembly are attached, the cam itself is affixed and not movable from the cam assembly. The magnet assembly 27 of base plate 20 meet with the magnet assembly 17 of cam assembly to create a magnetic bond holding cam assembly in stationary position in relation with base plate. In this position the space between cam 11 and spacer 25 is largest and the rope may travel through the path in direction A within belay device with least amount of friction. When a climber is climbing successfully hence requiring free feeding of the rope and not pulling to restrict the climb, this would be the position of the rope and the belay device where the user would be feeding the rope through the belay device as much as needed.

The desired directions of the force affecting the pivotal 23 movement of the cam assembly are different at the time when free feeding of the rope is desired and when the rope should be held in tension. In the free-feed position when the cam assembly's long prong is met with the long prong of the base plate at the jaw, the desired torque is to keep the two in the same position. When the rope is held in tension, caused by the pull of the rope strong enough to overcome the force holding the two prongs together, the desired torque is to allow the two prongs to separate to allow the cam assembly to quickly and firmly rotated to keep the rope jammed between the protruded part of the cam and the spacer of the base plate. The delicate balance of the required torque of the pivoting axis 23 of the cam assembly and the base plate is rather hard to achieve with purely mechanical means. Further the employment and relying on mechanical means, such as internal springs, to create such torque will subject the device to inevitable wear and failure. The employment of magnets to hold the base plate and cam assembly in stationary position for free feeding of the rope contribute to the longevity and consistency of the performance of the belay device as opposed to other mechanical means such as springs.

In the second embodiment of the device, an internal spring in the axis 23 of the cam assembly with rotational force in the reverse direction of torque created by the the magnetic pulls is employed to stabilize the locking action when the rope is pulled by tension caused by the load's fall or intentional braking by user.

Figure 6:
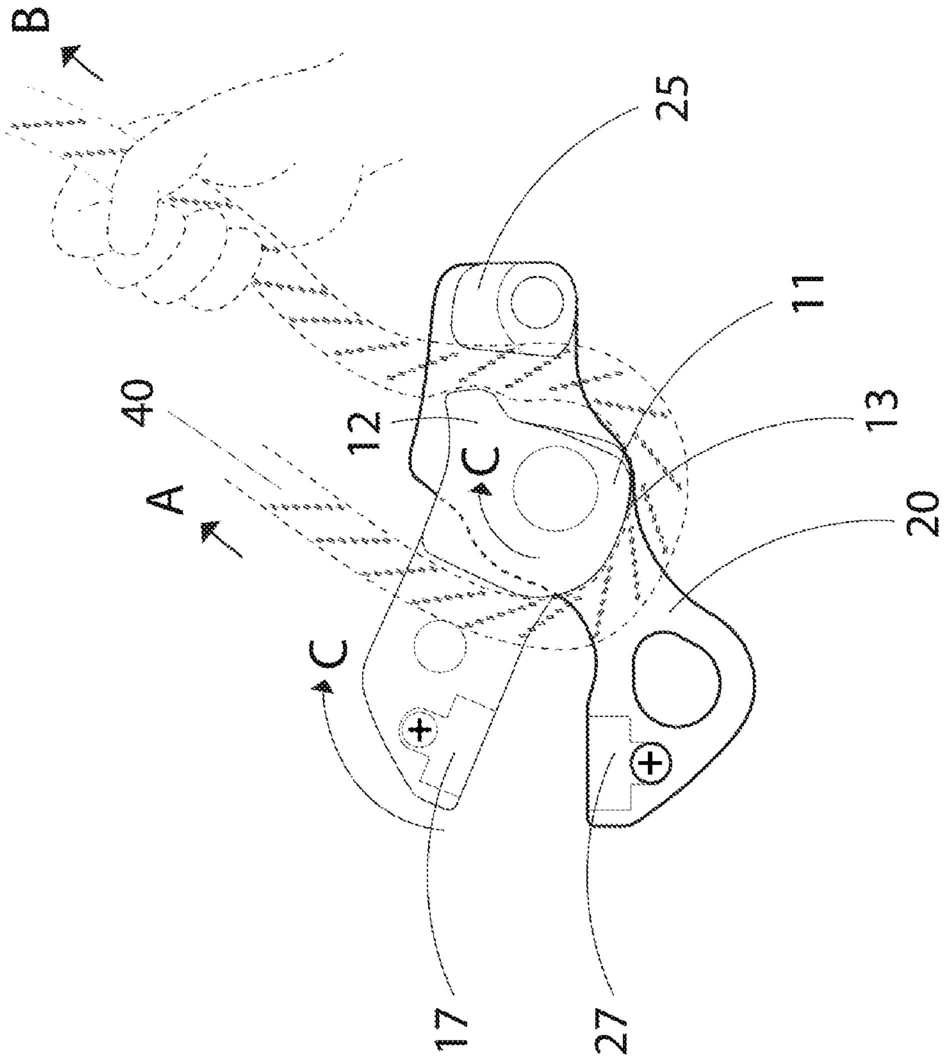
FIG. 6 is another side view of the belay device of FIG. 1, with a cover plate open, as the automatic braking by the cam unit is engaged.

In FIG. 6, shown without the cover plate 30 to illustrate the braking mechanism of belay device, the rope will be pulled in direction A abruptly when a load is created typically by tension between the belayer and an anchor, either from the unwanted fall or intended resting of the climber, the rope's pull in direction A with added force and/or velocity beyond the loose travel of the rope in free-feeding, will create a rotating force in direction C of the cam assembly causing the pivoting and approach of the protruded part 12 of the cam assembly toward spacer 25, pressing and holding the rope from further travel in direction A, which will turn the belay device into braking position. When the pull of the rope in direction A is strong enough the friction between the rope and the groove of the cam combined with the general pulling force of the rope in direction A will cause the jaw part of the cam to separate itself from the magnetic hold of the magnet assemblies 17 and 27 at the opposite end of the pivoting end of the cam, which in turn will rotate the cam on its axis in Direction C, towards braking position where the protrusion 12 of the cam presses the rope against the spacer 25. When the pull in direction A is sudden and with velocity higher than manual feeding of the rope, the friction between the rope and the circumference of the cam causes the cam to spin in direction C, overcoming the magnetic hold 17, 27 at the jaw of base plate and cam assembly, irrespective of the belayer's pull of the rope in direction B, and the braking of the rope through the built-in design of the cam assembly and the base plate will happen automatically, which is a crucial component of a useful belay device.

Figure 7:
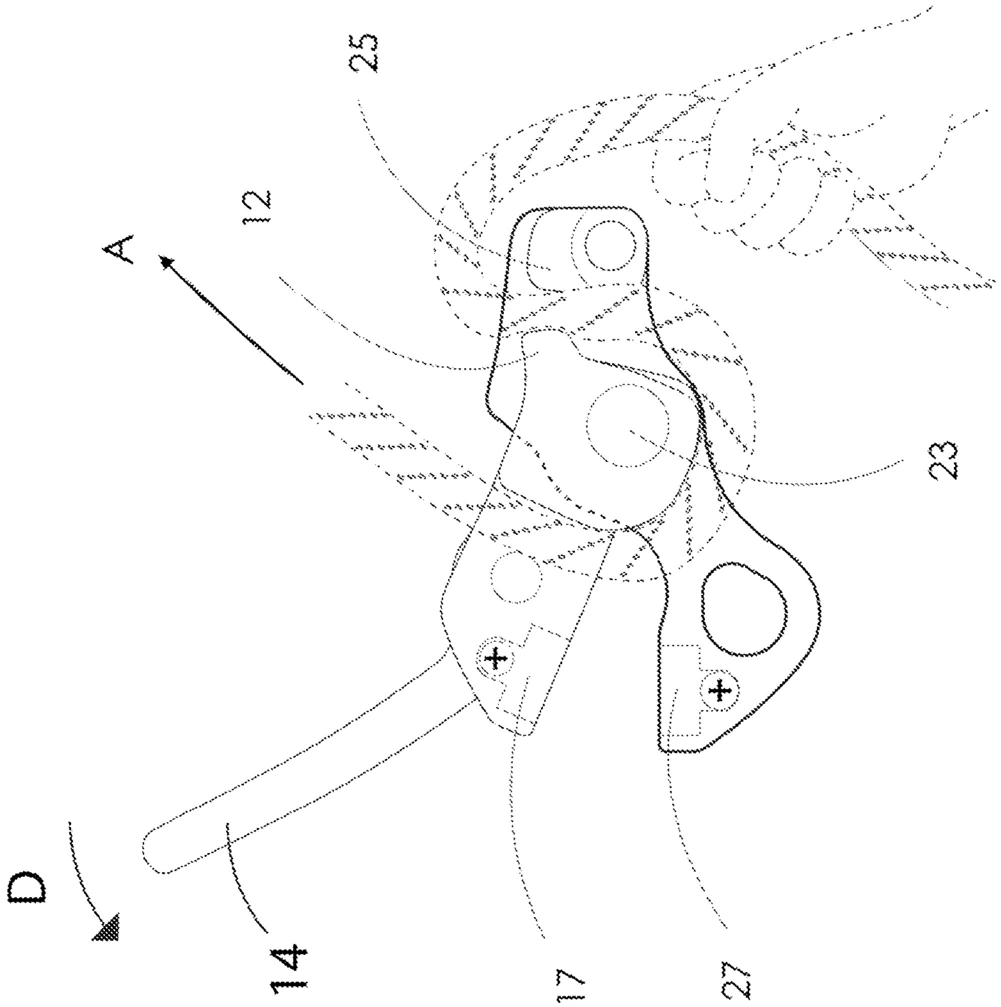
FIG. 7 is another side view of the belay device of FIG. 1, illustrating the operation of a release mechanism without the cover plate to reveal internal components of the belay device.

As shown in FIG. 7, also without the cover plate to illustrate the position of the rope, a belayer may initiate controlled release of rope by pulling the lowering handle in direction D. As lowering handle 14 is pulled down rotating the cam assembly at the axis 23 in direction D, the cam assembly pivots down toward the base plate, closing the gap between the two magnet assemblies 17 and 27, at the jaw of the base plate and the cam assembly, also moving the protrusion 12 of the cam away from the spacer 25 allowing the rope to move along Direction A in a controlled manner.

Referring back to FIGS. 1 and 2, when belay device 1 is in use, a carabiner links through the attachment holes of base plate 22 and cover plate 32 a to attach the belay device to the belayer's harness by use of an attachment means such as a carabiner or any other suitable attachment point.

In an embodiment of the invention the pivoting axis 23 joining the cam assembly 10 and the base plate rotate freely. The sole force causing the braking of the rope and holding it in tension will be the force created by the pull of the rope as well as the frictional forces between the cam and the rope.

In an alternative embodiment of the invention the pivoting axis 23 incorporates a spring to cause turn in the direction C (FIG. 6), albeit weaker than the forces created by the clamshell effect at the jaw of the two magnet assemblies 17, 27 of cam assembly and base plate. The purpose of the employment of the spring at the axis 23 in this fashion is to force created by the pivot spring once the tension of the rope is created by the rope's pull on the climber's side, or the load's side, activating the rotation of the cam on axis, will further stabilize the braking and holding of the rope in tension with or without the full attention of the belayer.

A belay device will be subjected to various conditions in temperature, humidity, dirts as well as other reality of the activities related to climbing, descending or other usage the device is intended. Hence the less number of moving parts and permanence of mechanism will be desired. Likewise, adaptability to various ropes is desired. When holding rope 40 under load, variations in rope diameter will affect the distance between protrusion of cam 12 and spacer 25 of the base plate, in actual braking position. Likewise, different rope constructions may have different rates of compressibility, which will also affect the distance between cam 12 and spacer 25. Additionally, different magnitudes of load applied to the belay device via the rope will result in different amounts of compression of the rope, which will affect the distance between cam 12 and spacer 25. These variables introduce the reality of usage the belay device may be subjected to, and can handle with the design. The employment of permanent magnets and least amount of moving parts contribute to the simplicity and durability of the present invention where both are important features in the condition the device will be subjected to.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A belay device for controlling descent of a load along a rope comprising:

a base plate with an attachment hole on the base plate's top end, a spacer incorporating a pin on the base plate's bottom end, and a magnet affixed on a lateral side of the base plate's top end;

a cam assembly pivotably attached on an axis to the base plate at the bottom end of the base plate and a bottom end of the cam assembly, with a magnet affixed on a lateral side on the cam assembly's top end so that the magnet of the cam assembly meets the magnet of the base plate and with an integrated and proprietarily shaped cam affixed at a center of the cam assembly, which the cam incorporates a protrusion, and with a designated path for placing a rope around the cam between the cam and the spacer, wherein the rope travels freely along the path around the cam from the bottom ends of the base plate and the cam assembly to the top ends of the base plate and the cam assembly when the cam assembly's top end and the base plate's top end are met and attached to each other by the magnetic forces of the magnets affixed on the cam assembly and the base plate, forming an unlocked position of the base plate and the cam assembly, and the rope travels without restriction around the cam as a result of a volitional feeding by hand;

wherein the rope is pulled abruptly beyond volitional feeding by hand or the rope's travel is resisted by pulling in the opposite direction of the travel, the rope pulls the cam assembly turning the cam assembly on axis at the spindle at the bottom end of the cam assembly overcoming the magnetic force attaching the top ends of the base plate and the cam assembly and separating the top ends of the base plate and the cam assembly, so that the protrusion of the cam approaches the spacer and closes a gap between the protrusion of the cam and the spacer to cause a brake resulting in a locked position to prevent further travel of the rope; and a lowering handle pivotably attached to the cam assembly with a torsion spring wherein the pulling of the lowering handle turns the cam assembly on the axis, widening the gap between the protrusion of the cam and the spacer to allow the rope to travel;

a cover plate pivotably attached on a bottom end to the spindle attaching the base plate and the cam assembly, wherein the cover plate is movable between an open position and a closed position, and an attachment hole at the cover plate's top end, wherein when the cover plate is in a closed position, the attachment holes of the base plate and the cover plate are aligned and an operator can maintain the belay device in the closed position by inserting an attachment means through the attachment holes, keeping the rope within designated path among the base plate, the cam assembly and the cover plate, and in the open position, the rope may be inserted or taken out of the belay device.

2. The belay device of claim 1, wherein the cam assembly includes the cam pivotably attached to the base plate, which freely rotates on the axis when a pulling force of the rope along with the friction over the circumference of the cam overcomes the magnetic force of the magnets of the base plate and the cam assembly and allows the base plate and the cam assembly to separate, wherein the wider part of the cam's circumference along with the spacer of the base plate press the rope, making the rope's travel along the gap between the cam and the spacer impossible, creating an automatic brake.

3. The belay device of claim 2, wherein the magnets of the base plate and the cam maintains the cam assembly in locked position with the base plate when closed, widening the gap between the cam and the spacer to allow unobstructed travel of the rope through the belay device.

4. The belay device of claim 2, wherein the lowering handle pivotally attached to the cam assembly and connected with a spring pin to keep the lowering handle in a tucked position when not in use.

5. The belay device of claim 2, wherein the lowering handle of the cam assembly is pulled to rotate the cam back toward the locked position, allowing the controlled travel of the rope along the gap between the cam and the spacer of the lower plate.

6. The belay device of claim 1, wherein the cam assembly includes the cam pivotably attached to the base plate with a spring, which assists the cam to rotate on the axis toward a braking position, but remains locked with the force of the magnets of the base plate and the cam assembly, wherein when a pulling force of the rope with the friction over the circumference of the cam overcomes the force of the magnets of the base plate and the cam assembly to separate allowing the cam assembly to turn whereby the wider part of the cam's circumference along with the spacer of the base plate presses the rope making the rope's travel along the gap between the cam and the spacer impossible, creating an automatic brake, at which point the added force of the spring on the axis of the cam assist in a controlled release of the rope as the lowering handle is pulled.

7. The belay device of claim 6, wherein the magnets of the base plate and the cam assembly maintains the cam assembly in a locked position with the base plate when closed, widening the gap between the cam and the spacer to allow unobstructed travel of the rope through the device.

8. The belay device of claim 6, wherein the lowering handle of the cam assembly is pulled to rotate the cam back toward the locked position, allowing the controlled travel of the rope along the gap between the cam and the spacer of the lower plate.

* * * * *